(12) United States Patent
Andrisin, III et al.

(10) Patent No.: US 11,065,941 B1
(45) Date of Patent: Jul. 20, 2021

(54) VEHICLE AIR FILTER

(71) Applicants: John J. Andrisin, III, Solon, OH (US); Rob Dingess, Sagamore Hills, OH (US)

(72) Inventors: John J. Andrisin, III, Solon, OH (US); Rob Dingess, Sagamore Hills, OH (US)

(73) Assignee: MARADYNE CORPORATION, Cleveland, OH (US)

( * ) Notice: Subject to any disclaimer, the term of this patent is extended or adjusted under 35 U.S.C. 154(b) by 0 days.

(21) Appl. No.: 16/555,053

(22) Filed: Aug. 29, 2019

Related U.S. Application Data

(60) Provisional application No. 62/725,613, filed on Aug. 31, 2018.

(51) Int. Cl.
| | |
|---|---|
| *B60H 3/06* | (2006.01) |
| *G07C 5/00* | (2006.01) |
| *B01D 46/44* | (2006.01) |
| *B01D 46/52* | (2006.01) |
| *B01D 46/00* | (2006.01) |
| *B01D 46/42* | (2006.01) |
| *G07C 5/08* | (2006.01) |

(52) U.S. Cl.
CPC ......... *B60H 3/0616* (2013.01); *B01D 46/008* (2013.01); *B01D 46/429* (2013.01); *B01D 46/446* (2013.01); *B01D 46/521* (2013.01); *G07C 5/008* (2013.01); *B01D 46/0086* (2013.01); *B60H 2003/0683* (2013.01); *G07C 5/0825* (2013.01)

(58) Field of Classification Search
CPC .......... B60H 3/0616; B60H 2003/0683; B01D 46/008; B01D 46/429; B01D 46/446; B01D 46/521; B01D 46/0086; G07C 5/008; G07C 5/0825
See application file for complete search history.

(56) References Cited

U.S. PATENT DOCUMENTS

| | | |
|---|---|---|
| 3,472,002 A | 10/1969 | Brown et al. |
| 3,870,495 A * | 3/1975 | Dixson ............. B01D 39/1615 55/489 |
| 4,514,193 A | 4/1985 | Booth |
| 4,538,556 A | 9/1985 | Takeda |
| 5,516,426 A | 5/1996 | Hull et al. |

(Continued)

*Primary Examiner* — Nay Tun
(74) *Attorney, Agent, or Firm* — Gugliotta & Gugliuotta LPA

(57) ABSTRACT

A vehicle intake air filter is provided forming an inner conduit formed between an upper orifice and a lower orifice. In addition to an outer filtering layer, a secondary filtering layer or layers are provided spanning the upper orifice. A monitoring mechanism for measuring and communicating a function of the air filter is further located within the upper orifice. The monitoring mechanism measures and communicates the function of the air filter. A plurality of sensors measure a differential pressure between the outer and inner surfaces of the filter. A remote communication system transmits sensor data from the sensors via a wireless communication protocol to a remote electronic monitor device, such as a cell phone. Increased pressure differential or filter performance or efficacy may thereby be displayed to the user on a real-time basis. The instant abstract is neither intended to define the invention disclosed in this specification nor intended to limit the scope of the invention in any way.

20 Claims, 5 Drawing Sheets

(56) References Cited

U.S. PATENT DOCUMENTS

| | | | |
|---|---|---|---|
| 5,549,724 A * | 8/1996 | Mochida | B01D 46/0021 55/336 |
| 5,685,887 A * | 11/1997 | Mochida | B01D 46/0049 55/336 |
| 5,741,351 A | 4/1998 | Beal et al. | |
| 5,856,198 A * | 1/1999 | Joffe | B01D 53/0454 422/82.01 |
| 5,958,093 A | 9/1999 | Nani et al. | |
| 6,833,023 B1 * | 12/2004 | Vandenberghe | B01D 29/906 55/337 |
| 6,887,293 B1 * | 5/2005 | Abad | B05B 14/43 55/385.2 |
| 6,955,699 B2 * | 10/2005 | Bergami | F02M 35/02483 55/385.3 |
| 7,178,410 B2 | 2/2007 | Fraden et al. | |
| 7,179,315 B2 * | 2/2007 | Huang | B01D 46/0046 55/337 |
| 8,382,870 B2 | 2/2013 | Troxell et al. | |
| 8,657,910 B2 | 2/2014 | Park et al. | |
| 8,657,936 B2 | 2/2014 | Sullivan | |
| 8,924,071 B2 | 12/2014 | Stanek et al. | |
| 9,183,723 B2 | 11/2015 | Sherman et al. | |
| 9,309,841 B2 | 4/2016 | Troxell et al. | |
| 9,492,690 B2 * | 11/2016 | Hamerly | G06K 7/10366 |
| 9,656,199 B2 * | 5/2017 | Lee | B01D 46/0041 |
| 2005/0210846 A1 * | 9/2005 | Miyagishima | B01D 46/0005 55/498 |
| 2005/0222933 A1 * | 10/2005 | Wesby | H04W 12/1206 705/36 R |
| 2005/0229777 A1 * | 10/2005 | Brown | B01D 46/0072 95/1 |
| 2007/0013534 A1 * | 1/2007 | DiMaggio | G08B 5/36 340/607 |
| 2007/0078528 A1 * | 4/2007 | Anke | G07C 5/008 700/21 |
| 2008/0190177 A1 * | 8/2008 | Wiggins | F02M 35/09 73/49.7 |
| 2010/0031616 A1 | 2/2010 | Gillingham et al. | |
| 2012/0073251 A1 | 3/2012 | Troxell et al. | |
| 2013/0239802 A1 * | 9/2013 | Troxell | B01D 46/0086 95/20 |
| 2019/0176075 A1 * | 6/2019 | Hoff | B08B 5/04 |

* cited by examiner

VEHICLE AIR FILTER

RELATED APPLICATIONS

The present invention claims benefit of U.S. Provisional Application No. 62/725,613, filed on 31 Aug. 2108 and incorporated by reference as if fully rewritten herein.

BACKGROUND OF THE INVENTION

1. Field of the Invention

The present invention relates to systems for the filtering of dirt and debris from the intake air for a vehicle's engine and, more particularly, to such a vehicle air filter system provided with filter performance feedback.

2. Description of the Related Art

In powering an internal combustion engine, both air and fuel must be consumed in order for combustion to occur that converts the fuel into mechanical energy. Without sufficient air for adding oxygen into the fuel mix, the engine uses up more fuel and cannot run at peak performance.

This is true of all types of motorized vehicles having internal combustion engines. Whether military vehicle, farm vehicle, heavy trucks or automobiles, the competing needs exist to both filter and remove dust, dirt and debris from the intake air, as well as to allow for sufficient and proper airflow through the engine air intake to accommodate the air-to-fuel combustion ratio demands of the engine.

For gasoline powered automobiles, three basic categories exist for any air intake systems. These may be described as: stock air intake; cold air intake; and short ram air intake.

Stock air intakes, otherwise known as original equipment manufacturer (OEM) intakes, are the ones included in vehicles that are fresh from the dealer. These intakes are characterized by having multiple bends that muffle the sound of the engine. Additionally, they also make use of paper filters to capture fine particles that may damage the engine.

Cold air intakes are a type of ram air intake systems that work by drawing in cool air from outside and into the vehicle's engine. This type of intake often has minimal bends and has a long duct with access to cool air. With cooler air coursing through the engine, combustion requires less heat and fuel.

Short ram air intakes suck in large amounts of heated air into the engine to help in efficient combustion. These short and wide pipes are often found on high-performance vehicles and aircrafts. Because it uses a pipe shorter than with the cold air intake, short ram intakes only have access to warm air near the engine. To make up for this such systems are designed to draw in more air than with cold air intakes.

In each of these categories of air intake system, maintaining the preferred operation of its filter is important to a number of aspects of the engine's performance. Proper operation of the entire air intake system may result in increased acceleration, improved acceleration response and increased horsepower. Also, since engines rely on a mixture of fuel and air, when there is not enough air pumping through the engine more gas is demanded in order to compensate for the lack of oxygen, resulting in poorer fuel efficiency. Further, in some enthusiast applications the air intake operation may also provide an enhanced sound, such as an aggressive sound resulting from a performance operation of a vehicle.

It is common for most vehicles to have disposable paper filters to catch debris. While such filters do their job in trapping particles that may potentially wreak havoc to the engine, such filters eventually require replacement. Most systems provide filters with instruction for replacement on an operational interval, such as every 10,000 miles or every year. Others suggest a visual inspection for dirt or debris as an analogy for degradation of filtering performance, but almost by definition such a metric would only be met after performance degradation had already occurred. In order to address this problem many typically aftermarket products provide a washable, reusable air filter media that purports to need cleaning at much larger interval, such as every 25,000 to 50,000 miles. However, such a solution does not solve a problem of preventing sub-optimal filter performance, but merely delays the time between occurrences.

It would therefor be preferable to provide any type of system or method that can provided a user with real-time or near real-time filter performance feedback in a manner that can alert a user to operational inefficiencies that can be corrected with replacement, or cleaning, of the filter media.

Generally in some ancillary applications, the current applicant has significant expertise with various improvements of vehicle combustion air filtration systems. For example:

In U.S. Pat. No. 8,323,370 a captive tooless fastener is described for securing the engine intake air filter. The tooless fastener allows for securing or removing of the air filter from the air filter housing without the need for additional hand tools. A threaded shaft mates with the tooless fastener so as to secure the air filter housing, and the fastener also acts as a handle for removal of the air filter from the housing. Optionally, the air filter is utilized in an air filter housing that is secured using a latch clamp assembly. In either configuration a person in the field can remove the air filter by inserting fingers under two arms about the body of the fastener oriented about 180°, and then pulling.

In U.S. Pat. No. 9,309,841 an air cleaner assembly is described that includes a self cleaning mechanism. The assembly uses a filter cartridge comprising filter media surrounding an open central interior provides a pulse jet distribution arrangement that communicates with the hollow interior section of the housing. The assembly further includes a device configured to direct a pulse of compressed gas into the open central interior of the filter cartridge. An evacuation valve arrangement is mounted to receive ejected dust from the filter cartridge and is adapted to direct the received ejected dust out of the air cleaner housing. Pulse jet cleaning of the filter is effective due to the pressure of the air, the direction and angle of dispersion, the volume of the air and the velocity of the air.

In U.S. Patent Application Publication US 2013/0239802 a system and method are provided to control cleaning of an air filter. Air flow across the air filter is estimated using a pressure sensor disposed at an inlet port and a pressure sensor disposed at an outlet port. Further, an optimal air flow across the air filter is calculated, with optimal air flow resulting in optimal filtering efficiency. A periodic cleaning rate is determined from the difference between the estimated air flow and the calculated optimal air flow to move air flow towards the optimal air flow.

In U.S. Patent Application Publication US 2014/0260135 an air pre-cleaner is provided for centrifugally ejecting heavier than air particulates from an air stream prior to entering an intake filter. The apparatus has an air intake that includes a flow directing vane that urges air past an impeller assembly. Rotation of the impeller deflects such heavier than air particulate to a wave washer. A two-part housing including first and second parts that are manually releasably securable together permits removal of housing part for cleaning of the pre-cleaner without the use of tools.

While some of these improvements in air filter operations may be incorporated into this invention in combination, other elements are different enough as to make the combination distinguished over the inventors' own prior art.

It is preferable that a vehicle system for the filtering of dirt and debris provide a user with filter performance feedback. Such feedback should be on a real-time or near real-time basis to allow for rapid replacement, or cleaning, of filters having sub-optimal airflow capabilities. It would further be preferable if such feedback can be provided in a remote manner, including a capability for wireless communication to a portable electronic device.

SUMMARY OF THE INVENTION

It is thus an object of the present invention to provide an improved system for the filtering of dirt and debris from the intake air for a vehicle's engine.

It is a feature of the present invention to provide such an improved vehicle air filter system provided with a system and method for communication of filter performance feedback.

Briefly described according to the preferred embodiment of the present invention, a vehicle intake air filter is provided forming an inner conduit formed between an upper orifice and a lower orifice. In addition to an outer filtering layer, a secondary filtering layer or layers are provided spanning the upper orifice. A monitoring mechanism for measuring and communicating a function of the air filter is further located within the upper orifice. The monitoring mechanism measures and communicates the function of the air filter. A plurality of sensors measure a differential pressure between the outer and inner surfaces of the filter. A remote communication system transmits sensor data from the sensors via a wireless communication protocol to a remote electronic monitor device, such as a cell phone. Communication may be via Bluetooth®, Wi-Fi, infrared wireless, ultra wideband, induction wireless, Zigbee, Z-wave or LoRaWAN so that Increased pressure differential or filter performance or efficacy may thereby be displayed to the user on a real-time basis.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Figure 1:
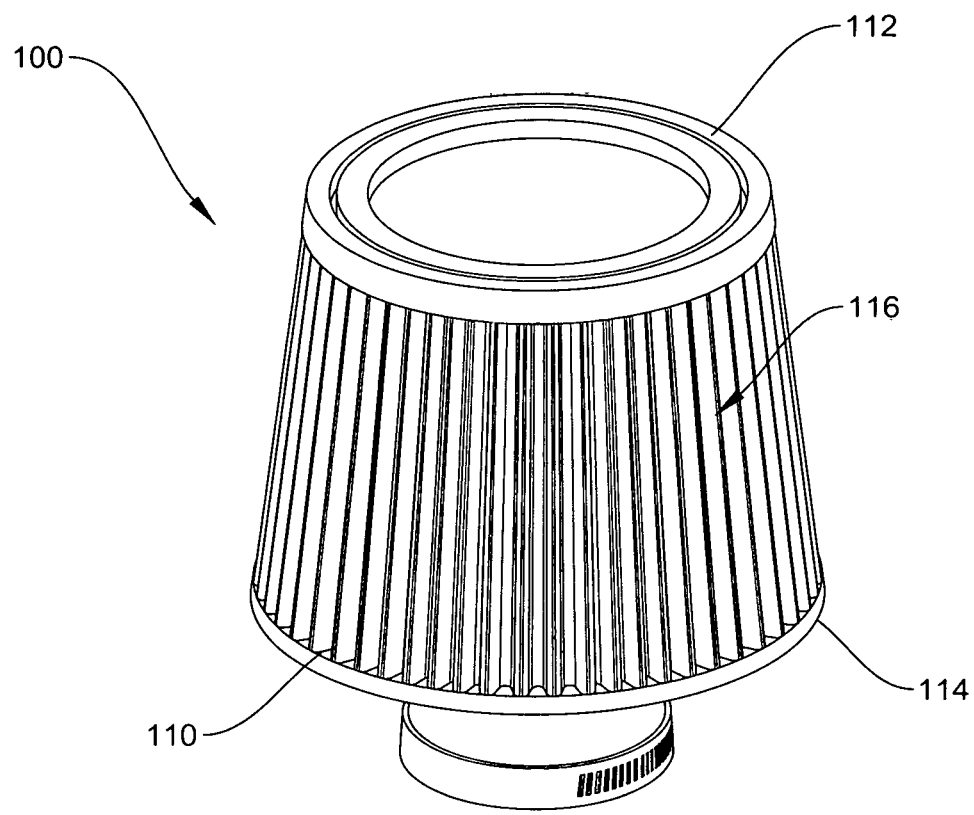
FIG. 1 is a perspective view of a vehicle air filter according to the PRIOR ART.
Figure 2:
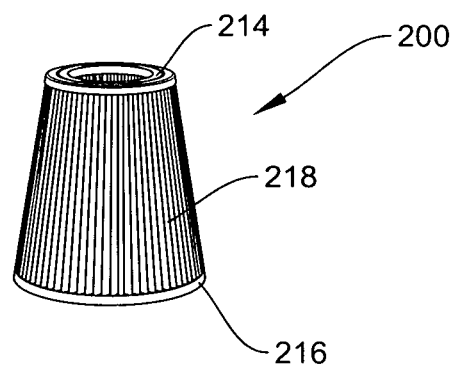
FIG. 2 is a is a front perspective view of a vehicle air filter incorporating improvements according to the present invention.
Figure 3:
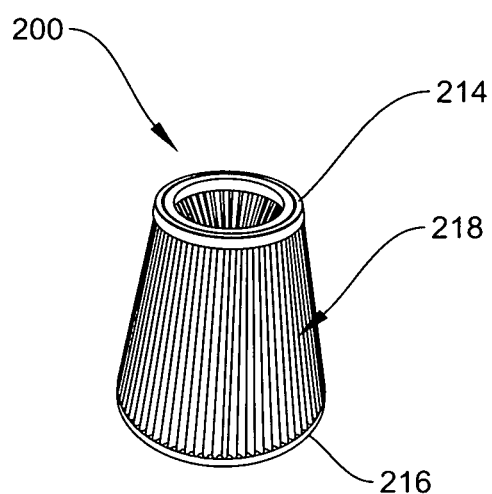
FIG. 3 is a front top perspective view thereof.

The best mode for carrying out the invention is presented in terms of its preferred embodiment, herein depicted within FIGS. 2-6, and as compared to the PRIOR ART as shown in FIG. 1.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to FIG. 1, views, a vehicle air filter 100 is shown generally according to the PRIOR ART. The filter 100 includes a supporting frame 110, formed of a plurality of skeletal cage elements between an upper housing cap 112 and a lower annular housing support 114. Outer filtering layer or layers 116 circumscribes the frame 110 formed between the upper cap 112 and lower ring 114. The outer filtering layers 116 may be fabricated of paper or a mesh made of polymer fibers.

Referring now to FIG. 2 through FIG. 6, wherein like reference numerals indicate the same parts throughout the several views, an improved vehicle air filter, generally noted as 200, is shown according to the preferred embodiment of the present invention. The air filter 200 includes a supporting frame 210, formed of a plurality of skeletal cage elements between an upper annular containment ring 214 and a lower annular housing support 216. Outer filtering layer or layers 218 circumscribing the frame 210 may be be formed between the upper ring 214 and lower housing 216. The outer filtering layers 218 may be fabricated of paper or a mesh made of polymer, cellulose or similar fibers that may or may not be coated with a nanocoating or similar or equivalent coating.

Figure 4:
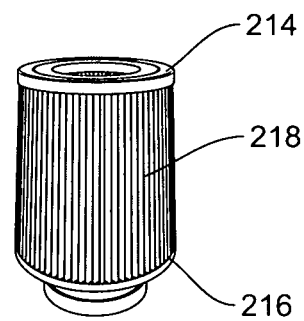
FIG. 4 is a front perspective view of an alternate configuration for a vehicle air filter incorporating improvements according to the present invention.
Figure 5:
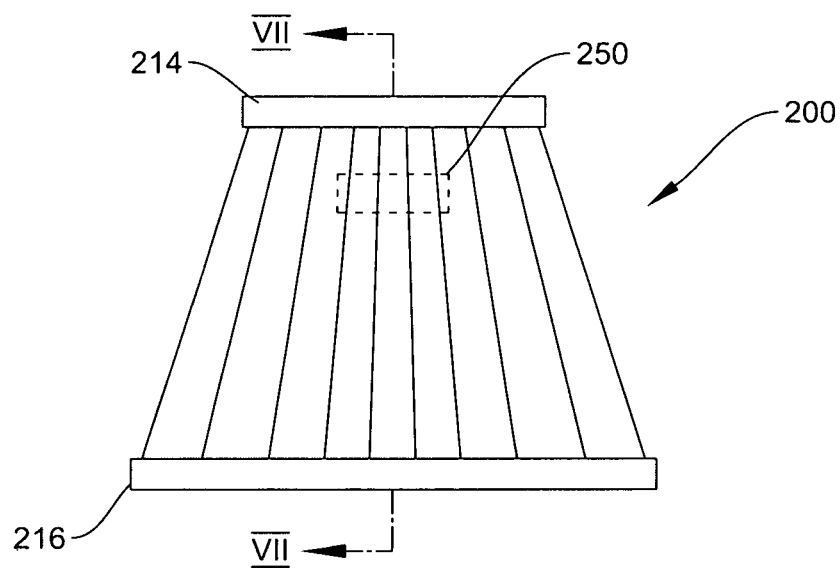
FIG. 5 is a front elevational view of the vehicle air filter of FIG. 2-3.
Figure 6:
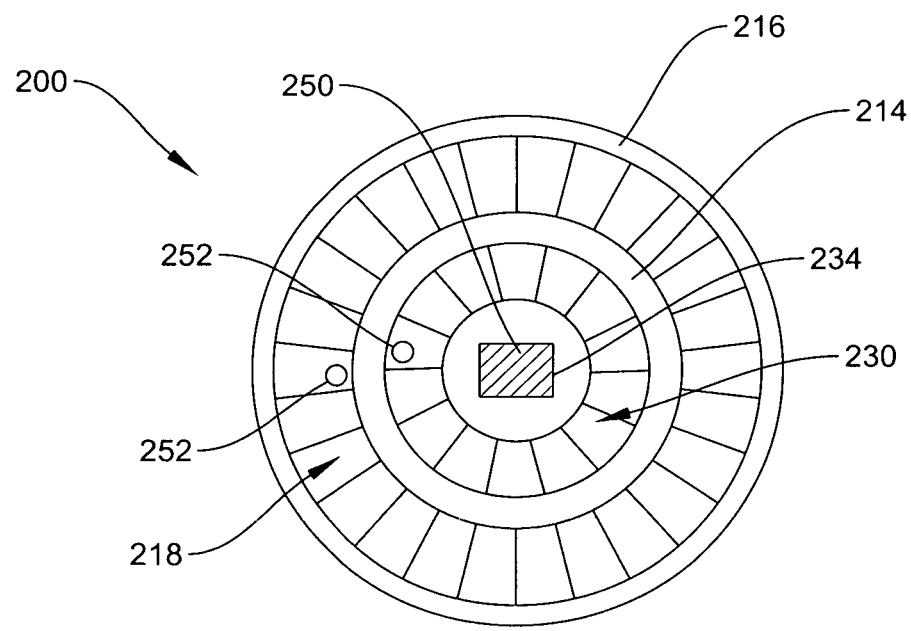
FIG. 6 is a top plan view thereof.
Figure 7:
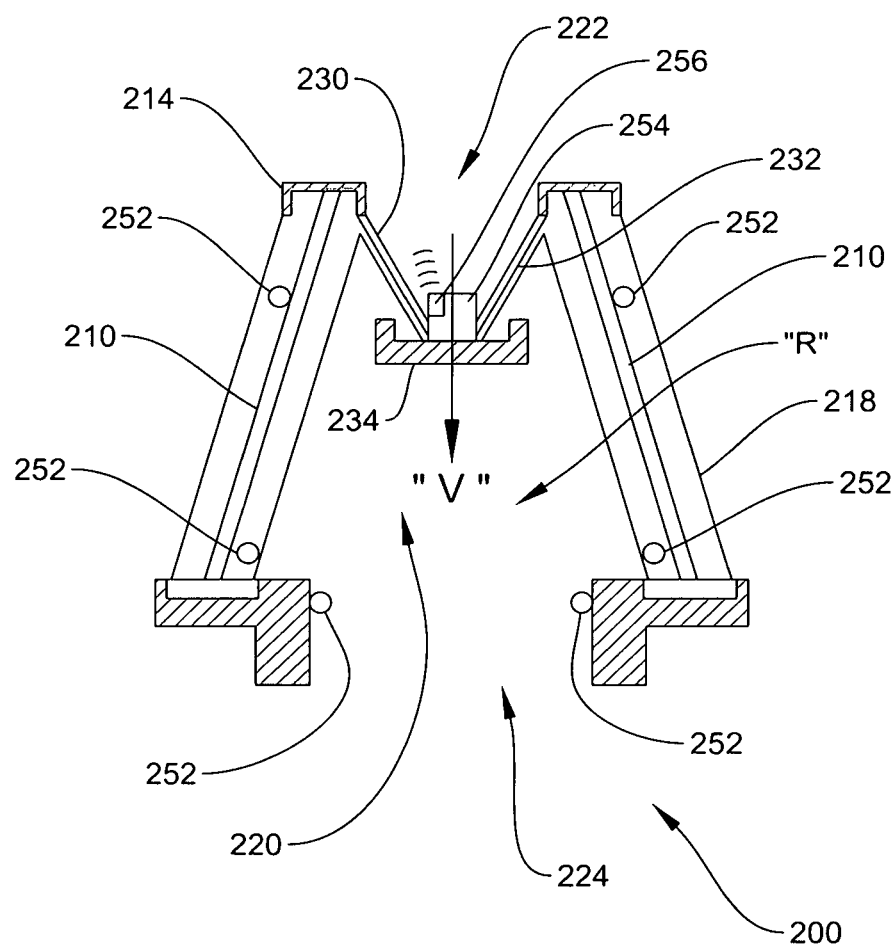
FIG. 7 is a cross sectional view taken along line VII-VII of FIG. 5.

The air filter 200 may be formed of a generally conical shape, but may alternately be formed in a cylindrical shape as shown in FIG. 4, or a disc shape, an oval shape or combination, similar or equivalent geometry that forms an inner conduit 220 between an upper orifice 222 and a lower orifice 224 and circumscribed by the outer filtering layer 218. The conduit 220 forms a fluid communication channel between the upper orifice 222 and lower orifice 224 via two separate pathways: vertically "V" through the conduit 220; and radially inward "R" from the outer filtering layer 218. While the embodiments depicted indicate generally cylindrical or generally conical shaped form factors, it should become apparent to those having ordinary skill in the relevant art, in light of the present teachings, that the present invention may be similarly adapted to other flat or panel style filter elements in an equivalent manner.

The upper orifice 222 further supports a secondary filtering layer 230. The secondary filter 230 is supported by a secondary frame 232 between the upper annular containment ring 214 and an inner housing support 234. The secondary filter 230 may be similarly fabricated of paper or a mesh made of polymer, cellulose or similar fibers that may or may not be coated, nano-coated, etc.

The entire mass of treated, filtered fluid (i.e. air) is directed to pass through the combination of outer filtering layer 218 and secondary filtering layer 320. The airborne contaminants (dust, pollen, e.g.) are captured by the filtering layers using either mechanical or electrostatic action.

It should be specifically noted that, whatever the shape or geometry of the overall filter 200, the inclusion of the secondary filter 230 provides additional filtering area over and above the filtering area provided by the outer filtering layer 218. The inclusion of an incrementally greater filtering area, along with a secondary fluid flow path "V", are designed and intended to provide for greater airflow passing through the filter along with an incrementally greater debris capturing area leading to a longer service life. As should be apparent to those having ordinary skill in the relevant art, in light of the present teachings, the combination of greater airflow and longer service life are each, and both, functionally effective improvements for use in any motor vehicle air intake application.

Figure 8:
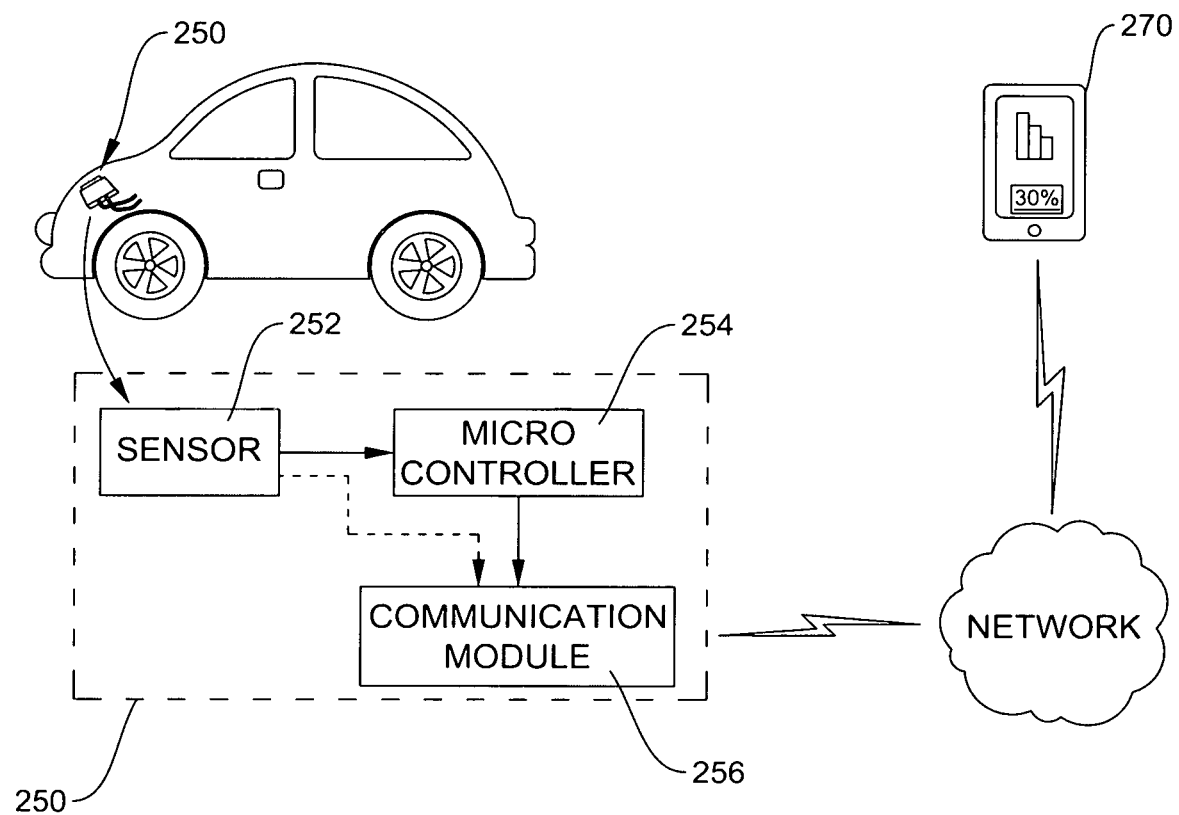
FIG. 8 is an exemplary control schematic for use therewith.

As shown best particularly in conjunction with FIG. 8, a monitoring mechanism 250 is provided for measuring and communicating the function of the air filter 200. According to a first exemplary embodiment, the monitoring mechanism 250 may include: one or a plurality of sensors 252; a micro controller 254; and a remote communication system 256. As described in greater detail below according to a second exemplary embodiment, the micro controller 254 may be eliminated and the communication system 256 may provide direct output from the sensors 252 to provide native data that may be subsequently adapted via a secondary application functioning on a remote electronic communication device.

According to one aspect of the present invention, the sensors 252 may measure the differential pressure between the outer surface of the filter elements 218, 230 and the inner surface of the filter elements 218, 230. The identification of an increased pressure differential and thus is indicative of a possible overload of the filter elements 18, 30 with dirt particles. According to another aspect of the present invention, sensors 252 may be used to identify only the pressure within the inner conduit 220. The monitoring and identification of only one pressure point may be subsequently be correlated to the operational life of the filter elements 218, 230. According to a final aspect of the present invention, sensors 52 may be used to identify and measure or approximate a fluid flow rate through the conduit 220. The measurement or approximation of airflow rates through the conduit 220 may provide a more direct identification of filter performance or efficacy.

The micro controller 254 and a remote communication system 256 are positioned within the upper orifice 222. According to a first exemplary embodiment, the micro controller 254 may be in operational electronic communication with the sensors 252 such that sensor measurement data of pressure or airflow may be received. The micro controller 254 may manipulate or adapt the sensor measurement data in order to provide a calculated feedback directed to filter operational performance. Pressure drop or volumetric flow rate for measuring flow, in addition to a time actuate monitor for determining the duration of such flow may be used to calculate percentage of filter life and/or other performance metrics as desired. Such calculated data may thereby be wirelessly remotely communicated via the remote communication system 256 According to the second exemplary embodiment, the micro controller 254 may me eliminated entirely, and the sensors 252 may communicate sensor data directly to the remote communication system 256. In either embodiment the remote communication system 256 may provide wireless communication to a remote electronic monitor device 270. Wireless communication protocol may provide a remote wireless signal between the communication system 56 and the remote monitor 270. Such wireless communication may be via Bluetooth®, infrared wireless, ultra wideband, induction wireless, Zigbee, Z-wave or LoRaWAN, or may include any other equivalently used Internet of Things (loT) remote application for communicating between the communication system 256 and the remote monitor 270.

The wireless communication of sensor measurement data of pressure or airflow may be received by the remote monitor 270. The remote monitor 270 may include a smart phone or similar device adapted to receive such communication. The display of filter performance data may be directly displayed. The display of calculated filter performance metrics, such as percentage of filter life, filter efficacy ratios, or the annunciation of alarms as indicia to replace or clean any filter media may be similarly be provided through a computer program designed to run on a mobile device such as a phone/tablet or watch that may run in a mobile web browser rather than directly on the mobile device.

2. Operation of the Preferred Embodiment

In operation as best shown in conjunction with FIG. 8, when a significant amount of contaminant is deposited onto the filter (i.e. the filter becomes clogged), the filter's resistance to air flow increases. The clogging may have multiple negative effects. The increased air flow resistance will reduce efficiency of the air treatment system. Energy consumption will rise. And the air flow may dislocate captured contaminants and make them airborne again. When such conditions can be identified to an unacceptable level the air filter should be changed or cleaned. Because the advisable timing of such maintenance will depend on many factors including, inter alia, quality of supplied air, humidity, temperature, geometry of the dwelling and air ducts, power of the blower, etc., such factors are unpredictable and continuously changing factors such that appropriate timing cannot be accurately guessed and, therefore, should be measured. When in use the filter 10 will provide real-time or near real-time filter performance feedback to a vehicle user in order to identify desired operational metrics, such as total volumetric throughput, current flow, percentage of filter life left, filter performance, etc.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar case law or subsequent precedent should not be made if any future claims are added or amended subsequent to this Provisional Patent Application.

What is claimed is:

1. A replaceable vehicle intake air filter for filtering intake combustion air for a vehicle's engine consisting essentially of:
    an upper annular containment ring;
    a lower annular housing support;
    a supporting frame formed of a plurality of skeletal cage elements between the upper annular containment ring and the lower annular housing support;
    an outer filtering layer or layers circumscribing the supporting frame;
    an inner conduit formed between an upper orifice and a lower orifice and circumscribed by the outer filtering layer, said inner conduit forming a fluid communication channel between the upper orifice and lower orifice;
    a secondary filtering layer or layers spanning the upper orifice; and
    a pressure monitoring mechanism mounted within said secondary filtering;
    wherein said monitoring mechanism is adapted for measuring and communicating changes in differential pressure across the secondary filtering layer or layers.

2. The vehicle intake air filter of claim 1, wherein said secondary filtering layer or layers and said secondary filter are fabricated of paper, nonwoven, or a mesh made of polymer fibers.

3. The vehicle intake air filter of claim 2, wherein fibers are further coated.

4. The vehicle intake air filter of claim 3, wherein said pressure monitoring mechanism is mounted within the secondary filtering layer or layers spanning the upper orifice in a manner that does not extend above the upper annular containment ring and further comprises:
    one or a plurality of sensors adapted to measure the differential pressure;
    a remote communication system for transmitting sensor data from said one or a plurality of sensors via a wireless communication protocol to a remote electronic monitor device; and
    said remote electronic monitor device further adapted for receiving sensor data from said one or a plurality of sensors and to identify an increased pressure differential and compare said increased pressure differential to a filter performance or efficacy.

5. The vehicle intake air filter of claim 2, wherein said monitoring mechanism for measuring and communicating the measurement of the monitoring mechanism and further comprises:
    one or a plurality of sensors adapted to measure the differential pressure;
    a micro controller, said micro controller receiving sensor data from said one or a plurality of sensors, said micro controller further adapted to identify an increased pressure differential and compare said increased pressure differential to a filter performance or efficacy,
    a remote communication system for transmitting filter performance metrics comprising the comparison of said increased pressure differential to a filter performance or efficacy via a wireless communication protocol to a remote electronic monitor device; and
    said remote electronic monitor device further adapted for displaying said filter performance metrics.

6. The vehicle intake air filter of claim 5, wherein said remote electronic monitor device comprises a cellular telephone or computer tablet and a computer program adapted to run on the cellular telephone or computer tablet in a mobile web browser or mobile app.

7. The vehicle air filter of claim 6, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

8. The vehicle air filter of claim 5, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

9. The vehicle intake air filter of claim 2, wherein said pressure monitoring mechanism is mounted within the secondary filtering layer or layers spanning the upper orifice in a manner that does not extend above the upper annular containment ring and further comprises:
one or a plurality of sensors adapted to measure the differential pressure;
a remote communication system for transmitting sensor data from said one or a plurality of sensors via a wireless communication protocol to a remote electronic monitor device; and
said remote electronic monitor device further adapted for receiving sensor data from said one or a plurality of sensors and to identify an increased pressure differential and compare said increased pressure differential to a filter performance or efficacy.

10. The vehicle intake air filter of claim 9, wherein said remote electronic monitor device comprises a cellular telephone or computer tablet and a computer program adapted to run on the cellular telephone or computer tablet in a mobile web browser or mobile app.

11. The vehicle air filter of claim 10, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

12. The vehicle air filter of claim 9, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

13. The vehicle intake air filter of claim 1, wherein said pressure monitoring mechanism is mounted within the secondary filtering layer or layers spanning the upper orifice in a manner that does not extend above the upper annular containment ring and further comprises:
one or a plurality of sensors adapted to measure a differential pressure across the secondary filtering layer or layers spanning the upper orifice;
a micro controller, said micro controller receiving sensor data from said one or a plurality of sensors, said micro controller further adapted to identify an increased pressure differential and compare said increased pressure differential to a filter performance or efficacy,
a remote communication system for transmitting filter performance metrics comprising the comparison of said increased pressure differential to a filter performance or efficacy via a wireless communication protocol to a remote electronic monitor device; and
said remote electronic monitor device further adapted for displaying said filter performance metrics.

14. The vehicle intake air filter of claim 13, wherein said remote electronic monitor device comprises a cellular telephone or computer tablet and a computer program adapted to run on the cellular telephone or computer tablet as a mobile app or in a mobile web browser.

15. The vehicle air filter of claim 14, wherein said wireless communication protocol comprises a remote wireless signal having a communication protocol selected from a group consisting of communication via Bluetooth®; Wi-Fi; infrared wireless; ultra wideband; induction wireless; Zigbee; Z-wave; and LoRaWAN.

16. The vehicle air filter of claim 13, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

17. The vehicle intake air filter of claim 1, wherein said pressure monitoring mechanism is mounted within the secondary filtering layer or layers spanning the upper orifice in a manner that does not extend above the upper annular containment ring and further comprises:
one or a plurality of sensors adapted to measure a differential pressure across the secondary filtering layer or layers;
a remote communication system for transmitting sensor data from said one or a plurality of sensors via a wireless communication protocol to a remote electronic monitor device; and
said remote electronic monitor device further adapted for receiving sensor data from said one or a plurality of sensors and to identify an increased pressure differential and compare said increased pressure differential to a filter performance or efficacy.

18. The vehicle intake air filter of claim 17, wherein said remote electronic monitor device comprises a cellular telephone or computer tablet and a computer program adapted to run on the cellular telephone or computer tablet in a mobile web browser or mobile app.

19. The vehicle air filter of claim 18, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

20. The vehicle air filter of claim 17, wherein said wireless communication protocol comprises a remote wireless signal having a communication protocol selected from a group consisting of communication via: Bluetooth®; Wi-Fi; infrared wireless; ultra wideband; induction wireless; Zigbee; Z-wave; and LoRaWAN.

* * * * *